United States Patent [19]
Heiberger

[11] 3,975,321
[45] Aug. 17, 1976

[54] SOUND REPRODUCTION COMPOSITIONS
[75] Inventor: Charles A. Heiberger, Princeton, N.J.
[73] Assignee: Air Products and Chemicals, Inc., Allentown, Pa. 18105
[22] Filed: May 13, 1974
[21] Appl. No.: 469,430

[52] U.S. Cl. .................. 260/18 PF; 260/23 XA; 260/31.8 R; 260/42.49; 260/897 C; 260/45.75 R; 260/45.75 K; 260/45.75 V; 260/45.75 W; 260/998.16; 526/329; 526/345
[51] Int. Cl.² .................. C08F 214/06; C08K 3/10; C08L 91/00
[58] Field of Search .................. 260/87.5 C, 998.16, 260/18 PF, 23 XA, 31.8 R, 897 C, 45.75 R, 45.75 K, 45.75 V, 45.75 W

[56] References Cited
UNITED STATES PATENTS
3,468,858   9/1969   Heiberger et al. ............. 260/87.5 C

*Primary Examiner*—James H. Derrington
*Attorney, Agent, or Firm*—Richard A. Dannells, Jr.; H. Barry Moyerman

[57] ABSTRACT

Novel sound reproduction molding compositions of good processing qualities are disclosed, based on copolymer of vinyl chloride and propylene. Records obtained therefrom, have good audio qualities and resistance to impact, thermal warpage and water blistering. Because of their high heat stability, formulations based on the vinyl chloride-propylene (VC/P) copolymers can be employed in making sound records not only by the usual compression molding techniques, but also by injection molding.

15 Claims, 1 Drawing Figure

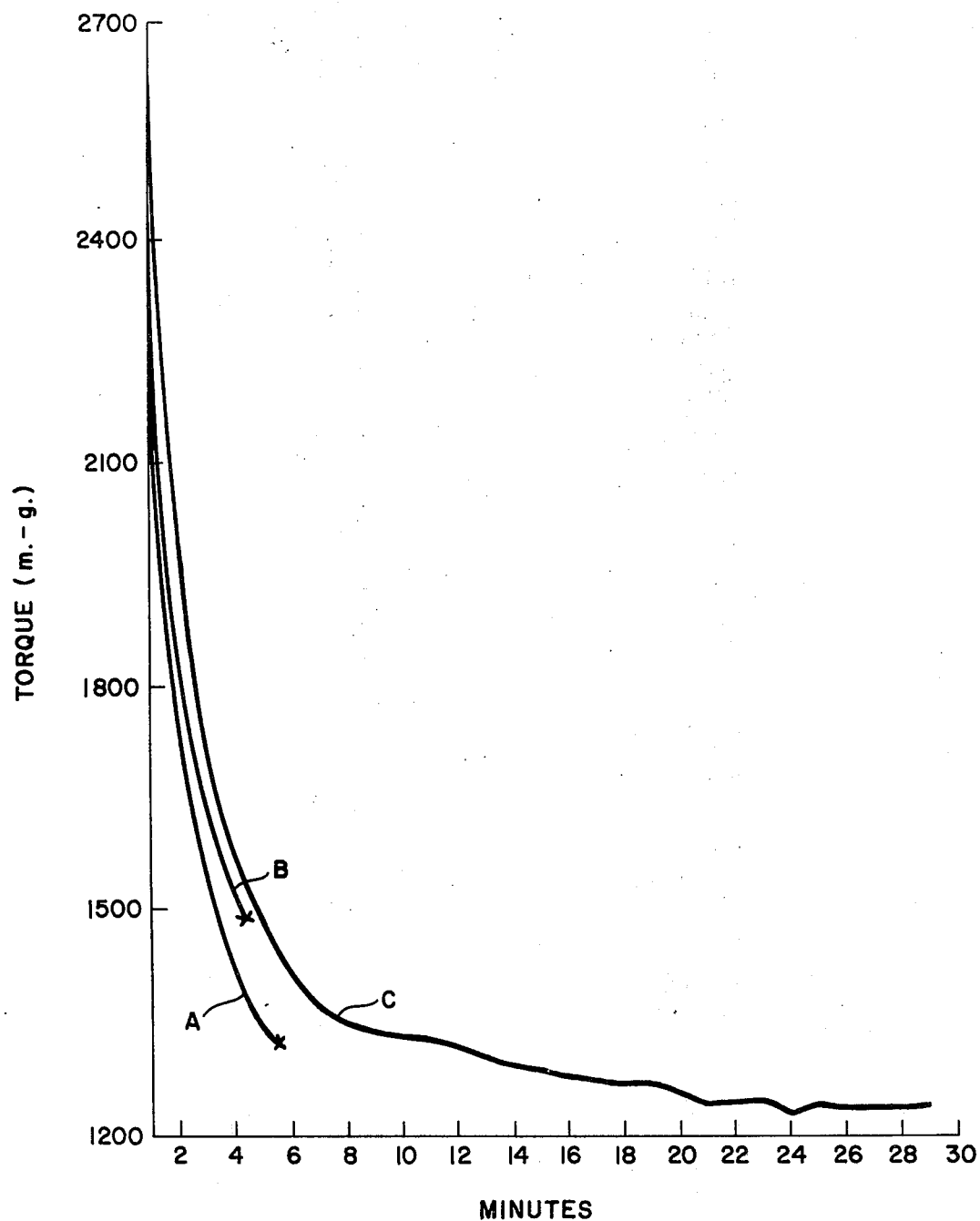

SOUND REPRODUCTION COMPOSITIONS

BACKGROUND OF THE INVENTION

Conventional phonograph records have heretofore been manufactured by compression molding of thermoplastic resin compositions such as copolymers of vinyl chloride with vinyl acetate. These are generally made by melt extrusion of a biscuit of the thermoplastic resin composition including certain heat stabilizers, fillers and other customary additives, and subjecting the biscuit to heat and pressure in compression molds to form discs of desired dimensions. The molding composition, whether used in biscuit or granular form, must have good flow properties at the molding temperature so as to fill the mold completely and conform to the fine impression of the grooves, faithfully to reproduce the signal modulations recorded on the master, substantially free of audible extraneous noises.

BRIEF DESCRIPTION OF THE INVENTION

In accordance with the present invention, there is provided a vinyl chloride-propylene copolymer resin composition of improved processing qualities for use in molding of high quality sound record discs. The molded records obtained from formulations employing the copolymers of the invention in addition to acceptable sound qualities, have improved physical properties including dimensional thermal stability, enhanced wear properties and good impact resistance.

BRIEF DESCRIPTION OF THE DRAWING

The single FIGURE in the accompanying drawing is a graphic representation of the curves obtained in Brabender torque rheometer tests of record molding formulations employing a copolymer of the present invention as compared to those containing typical commercial vinyl chloride-vinyl acetate (VC/VAc) copolymers.

DETAILED DESCRIPTION

The molding compositions employed in the present invention are based on a vinyl chloride-propylene copolymer comprising 2–12% by weight of propylene in the copolymer, preferably between about 4 and 8% by weight propylene, having an intrinsic viscosity (I.V.) in the range of 0.45 to 0.7 dl./g. or somewhat above, and a melt flow rate in the range from about 50 to about 500 dg./min. at 190°C (ASTM D 1238 Condition F). The molding compositions of the invention may further contain the usual heat stabilizers, flow additives, and lubricants generally employed in production of thermoplastic sound record discs, and other conventional components of such molding compositions including pigments, fillers, oil soluble dyes and anti-static agents.

The flow additives may be used in an amount up to about 10% by weight of resin and may be selected from among poly alpha methyl styrene, polyacrylates, polymethacrylate, methacrylate-acrylate-styrene interpolymers, and organic ester plasticizers in general.

The usual lubricants and heat stabilizers may also be employed in amounts of up to about 10% by weight of resin in the composition. Among such heat stabilizers there can be employed not only the typical lead soaps and conventional barium-lead stabilizers used in record molding formulations comprising vinyl chloride-vinyl acetate copolymer resins, but also the non-toxic metallo-organic compounds such as calcium and zinc soaps, which latter cannot be used with the less heat-stable conventional vinyl chloride-vinyl acetate copolymers.

Other additives such as carbon black or other pigments, oil soluble dyes, anti-static agents may be employed in amounts of up to about 2% by weight of the resin.

In forming the molding compositions, the selected vinyl chloride-propylene copolymer is thoroughly admixed with the additives and worked up in conventional equipment to form biscuits of suitable size for use in the record press or mold.

The base copolymer of vinyl chloride and propylene, in the proportions and having the intrinsic viscosity and melt flow characteristics hereinbefore set out, may be prepared in accordance with the procedure described in U.S. Pat. No. 3,468,858, patented Sept. 23, 1969.

EXAMPLE 1 a. The base resin employed was a copolymer of vinyl chloride and propylene containing 4% of copolymerized propylene by weight, and having an intrinsic viscosity of 0.53 dl/g.

Base resins employed for comparison included:

b. one containing 8% copolymerized propylene, which copolymer had an I.V. of 0.53 dl/g; and c. one containing 7% copolymerized propylene, which copolymer had an I.V. of 0.6 dl/g.

Each of the foregoing basic vinyl chloride propylene copolymers had a melt flow rate in the range of 100 – 300 dg./min. at 190°C.

The control composition C-1 was a vinyl chloride-vinyl acetate copolymer conforming to those commercially employed in compression molding of sound record discs. The base copolymer had an I.V. of 0.5 dl/g and contained about 13.5% of copolymerized vinyl acetate. It was made by blending 90% of one and 10% of another of two commercial vinyl chloride-vinyl acetate resins, the first containing 14% copolymerized vinyl acetate and having an I.V. of 0.5 dl/g, and the second comprising 10% vinyl acetate as copolymerizate and having an I.V. of 0.52 dl/g.

Each of the above base resins was dry blended with a Ba/Pb stabilizer and other additives indicated in Table I below and the melt flow characteristics of the formulations determined.

TABLE I

| Formulation | 1 | 2 | 3 | 4 | 5 | 6 |
| --- | --- | --- | --- | --- | --- | --- |
| Base Resin | Example 1a | Example 1a | Example 1a | Example 1b | Example 1c | Control C-1 |
| Weight % Monomer | 4 | 4 | 4 | 8 | 7 | 13.5 |
| Copolymer Type | VC/P | VC/P | VC/P | VC/P | VC/P | VC/VAc |
| Additives, (phr) | | | | | | |
| (a) Barium-lead stabilizer | 1.5 | 1.5 | 1.5 | 1.5 | 1.5 | 1.25 |
| (b) Epoxidized soya oil | 1.0 | 1.0 | 1.0 | 1.0 | 1.0 | — |
| (c) Channel black | 0.25 | 0.25 | 0.25 | 0.25 | 0.25 | 0.50 |

TABLE I-continued

| Formulation | 1 | 2 | 3 | 4 | 5 | 6 |
|---|---|---|---|---|---|---|
| Base Resin | Example 1a | Example 1a | Example 1a | Example 1b | Example 1c | Control C-1 |
| (d) poly α-methyl styrene | — | 10.0 | 10.0 | — | — | — |
| (e) organic ester plasticizer | — | — | 2.0 | — | — | — |
| Melt flow, (dg./min.) | | | | | | |
| at 158°C | 1.1 | 2.0 | 8.1 | 11.5 | 1.7 | 26 |
| at 177°C | 21 | 32 | — | 84 | 27 | 96 |

Notes:
(a) Mark 232 B: (Argus Chemical Co.)
(b) Flexol EPO; (Union Carbide Corp.)
(c) Carbolac No. 2; (Cabot)
(d) Amoco 18-210; (Amoco Chem. Co.)
(e) Monoplex S38; (Rohm & Haas)
Columns 2 and 3 illustrate the effect of including flow additives in the composition.

The audio wear qualities of stereo sound records made by compression molding of certain of the compositions identified in Table I above, were tested after 50 continuous replays and rated by an expert sound engineer. The three records made with vinyl chloride-propylene copolymer compositions showed substantially better audio qualities than the control made with a typical commercial vinyl chloride-vinyl acetate copolymer composition. The ratings are reported in Table II below, ranging from 1 = Good to 5 = Poor.

TABLE II

| | Ratings After 50 Replays | | | Control C-1 |
|---|---|---|---|---|
| | VC/P Col. 1 | VC/P Col. 2 | VC/P Col. 5 | VC/VAc Col. 6 |
| Example | 1a | 1a | 1c | C-1 (control) |
| Silent Band | | | | |
| Grit | 2 | 2+ | 2 | 2 |
| Hiss | 1 | 1+ | 1− | 3 |
| Swish | 0 | 1 | 0 | 2 |
| Distortion | NA | NA | NA | NA |
| OVERALL | 3 | 4+ | 3− | 7 |
| Music Band | | | | |
| Grit | 1 | 1 | 1 | 2 |
| Hiss | 1 | 3 | 2 | 3 |
| Swish | 0 | 0 | 0 | 2 |
| Distortion | 0 | 0 | 0 | 0 |
| OVERALL | 2 | 4 | 3 | 7 |

NA = not applicable

Further tests were run to determine resistance to warpage. Resistance to thermal warpage is related to the glass transition temperature (Tg) and to modulus rigidity at lower temperatures.

TABLE III

| | Test Data Show the Following Temperature °C | | |
|---|---|---|---|
| | $T_f^{(1)}$ | $T_4^{(2)}$ | $T_g^{(ext)}$ |
| Table 1, Col. 1 | 65 | 73 | 69 |
| 2 | 63 | 71 | 67 |
| 3 | 59 | 64.5 | 62 |
| 4 | 63 | 68 | 65.5 |
| Control C-2 | 50 | 58 | 54 |
| Control C-3 | 48 | 56 | 52 |

$^{(1)}$Temperature (°C) corresponding to an apparent modulus of elasticity (E) of 135,000 psi (rigid).
$^{(2)}$Temperature corresponding to an apparent modulus of elasticity (E) of 10,000 psi (semi-rigid).
Control C-2 was a commercial VC/VAc copolymer formulation used in record molding, similar to Control C-1 in composition and properties.
Control C-3 was another commercial VC/VAc formulation used in record molding.

The higher glass transition temperatures obtained by each of the VC/P compositions, as shown in Table III above, compared with the commercial VC/VAc record molding compositions, indicates significantly better resistance to warping. In addition, records molded from VC/P showed better impact toughness (less breakage on drop tests) and better resistance to blistering (after immersion in water) than the VC/VAc compositions tested.

Improved thermal stability for processing (molding) is demonstrated by oven and Brabender torque rheometer tests. The oven tests were carried out without carbon black in the formulation so as to note color change on heating. Heated in an oven to 350°F (without carbon black) the VC/P copolymer compositions tested, turned yellow in 20 – 25 minutes, amber in 35 minutes, and dark amber in 60 minutes. The VC/VAc copolymer composition turned yellow in less than 15 minutes, amber in 20 minutes, and black in 50 minutes.

Comparative heat stability runs were carried out on a VC/P molding composition and several VC/VAc molding compositions by standard Brabender Torque Rheometer tests at 150°C and 63 ppm in a No. 6 bowl. The results are graphically shown by the curves in FIG. 1 of the accompanying drawings, plotting torque in meter grams against time. Curves A and B are plots of runs made with VC/VAc copolymers containing 13 – 14% of the VAc comonomer and having an I.V. of 0.5. Curve C is the plot of a run made on a VC/P copolymer containing 5% propylene comonomer and having an I.V. of 0.47. It will be seen from these curves that both of the VC/VAc copolymers were decomposed in about 5.5 minutes as indicated by $x$ at the ends of these curves, whereas the VC/P copolymer had not yet decomposed at 29 minutes.

The wear properties of a record produced from a formulation employing VC/P copolymer resin was subjected to abrasion test and compared with a similar formulation based on a standard VC/VAc copolymer. These resin formulations are identified in Table IV below.

TABLE IV

| Base Resin | VC/P | VC/VAc | VC/VAc |
|---|---|---|---|
| I.V. (dl/g) | 0.58 | 0.52 | 0.52 |
| Melt flow (dg./min.) at 190°C | 86.9 | — | — |
| Melt flow (dg./min.) at 153°C | — | 9.5 | 5.7 |
| % Propylene | 4 | — | — |
| % vinyl acetate | — | 14.0 | 10.7 |
| Formulation (phr) | (I) | (II) | |
| | | 88 Blend 12 | |
| Base Resin | 100 | 100 | |
| Lead stabilizer | 1.5 | 1.5 | |

TABLE IV-continued

| | | |
|---|---|---|
| Channel black | 0.5 | 0.5 |

Each of the resin formulations of Table IV was tested by the Taber abrasion method. The specimens were subjected to a 1000 gm. load for 1000 cycles using a No. 17 Calibrase wheel, and the % loss determined. The VC/P formulation showed a loss of 0.190% as compared to 0.298% for the formulation containing the VC/VAc blend, constituting an improvement of more than 55% in abrasion resistance.

In the production of sound records from VC/VAc based formulation, compounds of lead and/or barium are usually employed as heat stabilizers. While these compounds are indeed toxic, they are not presently considered hazardous when employed in making records. Stabilizer systems of a non-toxic nature which have been sanctioned by the Food and Drug Administration for use in resin compositions where lead compounds are contraindicated, such as Ca/Zn systems, are not effective as stabilizers in record molding compositions based on VC/VAc. In an oven test at 350°F, such compositions stabilized by Ca/Zn, turn black in less than 15 minutes. On the other hand VC/P record molding compositions employing Ca/Zn stabilizer showed good thermal stability. Two such resin formulations, identified in Columns 7 and 8 of Table V, oven tested at 350°F (carbon black omitted), turned light yellow in 30 minutes, yellow in 45 – 50 minutes, amber in 60 – 70 minutes, and required over 100 minutes to degrade to black color.

Typical formulation of VC/P copolymer record molding compositions employing non-toxic Ca/Zn stabilizers are illustrated in Table V below:

TABLE V

| | Col. 7 | Col. 8 | Col. 9 | Col. 10 |
|---|---|---|---|---|
| Resin Type | VC/P | VC/P | VC/P | VC/P |
| Wt. % comonomer | 4 | 4 | 8.5 | 8.5 |
| I.V. dl/g | 0.53 | 0.53 | 0.51 | 0.51 |
| melt flow, dg./min. | 120 | 120 | 275 | 275 |
| Formulation, phr | | | | |
| ①Mark 34 | 1.5 | 1.0 | 1.0 | 1.0 |
| ②Mark 1141 | 1.0 | — | — | — |
| ③Mark QED | — | 1.0 | 1.0 | 1.0 |
| Flexol EPO | 1.0 | 1.0 | 1.0 | 1.0 |
| ④Wax OP | — | 0.25 | 0.25 | 0.25 |
| Amoco 18 – 210 | — | 10.0 | — | 5.0 |
| Carbolac No. 2 | 0.50 | 0.25 | 0.25 | 0.25 |
| Melt Flow, dg./min. | | | | |
| at 158°C | — | 2.8 | 8.8 | 15.4 |
| at 177°C | 24.0 | — | — | — |

Notes:
①②③Ca-Zn stabilizers marketed by Argus Chemical Co.
④Mixed butylene glycol, calcium soap of montanic acid (Hoechst)

The molding of quadriphonic 4-channel records presents special problems from the standpoint of maintaining audio quality. For the most part, the typical record molding formulations based on VC/VAc do not give records having acceptable audio wear performance. More recently, there has been proposed a VC/VAc copolymer formulation employing a tin stabilizer, which demonstrated borderline acceptability after 50 replays. This formulation and certain of its properties are reported in Table VI below. The VC/P copolymer composition (column 12) was found to have improved processing properties over the VC/VAc formulation (column 11) evidenced by 20% reduction in cycle time; and proved slightly better in audio wear properties after 50 replays. All of the advantages of the stereo records made by compression molding of VC/P copolymer formulations were also retained in the quadriphonic records made from VC/P copolymers.

TABLE VI

Formulations for Quadriphonic Records

| Base Resins | Col. 11 | Col. 12 | Col. 13 | Col. 14 | Col. 15 |
|---|---|---|---|---|---|
| Type | VC/VAc⑥ | VC/P | VC/P | VC/P | VC/P |
| I.V. dl/g | 0.5 | 0.53 | 0.53 | 0.53 | 0.53 |
| Wt. % comonomer | 13.5 | 4 | 4 | 4 | 4 |
| Formulation phr | | | | | |
| ①Mark 275 | 2.1 | — | — | — | — |
| Mark 232B | — | 1.5 | 1.5 | 1.5 | 1.5 |
| Flexol EPO | 1.05 | 1.0 | 1.0 | 1.0 | 1.0 |
| Ca stearate | 0.8 | — | — | — | — |
| Mineral oil | — | — | 0.25 | — | — |
| ②Loxiol G 60 | — | — | — | 1.0 | — |
| ③Loxiol G 70 | — | — | — | — | 0.25 |
| Fluorinated graphite | — | — | — | 0.1 | — |
| ④Catanac 609 (50%) | 1.05 | — | — | — | — |
| ⑤Mark AL-13 | — | 0.5 | 0.5 | 0.5 | 0.5 |
| Carbolac No. 2 | 0.5 | 0.5 | 0.5 | 0.5 | 0.25 |
| Egar Extrusion | | | | | |
| Motor, amps | 20 | 22 | 21 | 22 | 22 |
| Zone Temp., °F | 260 | 310 | 310 | 310 | 310 |
| Stock Temp., °F | 316 | 382 | 364 | 360 | 340 |
| Extrusion Time, sec. | 9.7 | 7.7 | 8.4 | 8.5 | 8.5 |
| Biscuit porosity | very dense | very dense | dense | very dense | very dense |

Notes:
①Liquid organic tin stabilizer
②Saturated aliphatic alcohol ester of dicarboxylic acids
③Triester of saturated fatty acids
④Cationic antistatic agent (Cyanamid)
⑤Non-ionic antistatic agent (Argus)
⑥Mixture of
 {90% VC/VAc containing 14% VAc, 0.50 I.V., and
 {10% VC/VAc containing 10% VAc, 0.52 I.V.

The molding compositions of the present invention can be employed in production of phonograph record discs by compression molding in the same types of equipment and employing the same procedures as those conventionally used in the production of records from VC/VAc molding compositions. Typically, the formulations are compounded in an Egar Extruder Werner and Pfleiderer Compounder, a Banbury mixer or other similar plastifying machine at appropriate temperature for several minutes, sheeted if necessary in a roll-mill and cut into the shape of biscuits, which are subjected to compression molding at pressures in the order of about 1750 psig. The VC/P formulations, in general, require somewhat higher compounding and molding temperatures than those employed in the case of the formulations based on VC/VAc. Depending largely upon the flow additives in the formulation, compounding and molding temperatures in the general range of 300° – 375°F and up to about 400°F, may be employed for the VC/P systems.

A further advantage of the VC/P resin formulations of the present invention is in the production of 12 inch Long Playing (LP) and stereo records by injection molding. Because of their relatively poor thermal stability, attempts to produce stereophonic record discs by injection molding of VC/VAc resin formulations have not proved successful. Formulations employing styrene resins have been found acceptable in injection molding of seven inch 45 RPM records, where the grooves are more widely spaced. The 12 inch LP records which have more closely spaced grooves, when made from styrene tend to chip, unless handled with extreme care in playing and using a very fine needle. Injection molding of sound records is favored, if possible to produce acceptable quality stereophonic records by this procedure, because of cost savings stemming from the ability to employ multiple cavity molds in their production and significant reduction in required cycle time. Moreover, the large amount of material wastage due to the need for trimming of flash in compression molded records is obviated or substantially reduced in the case of injection molding.

A typical formulation for injection molding of records from VC/P copolymer is set out below:

|  | phr |
|---|---|
| VC/P (4–4.5% propylene) | 100 |
| Ferro 13V57 (Ba/Cd stabilizer) | 2.0 |
| Carbolac No. 2 | 0.5 |

The VC/P copolymer is preferably one having an I.V. of 0.45 to 0.6 and a melt flow rate of 150 to 300 dg./minute. To the above formulation there may be added any of the usual flow additives, lubricants, anti-static agents, etc. Injection molding may be carried out at 350° – 400°F.

I claim:

1. A phonograph record comprising a disc formed from a synthetic resin molding composition comprising as the resin therein a copolymer of vinyl chloride with propylene, said copolymer containing from about 4 to 8% by weight of propylene, and said copolymer having an intrinsic viscosity from about 0.45 to 0.7 dl./g. and a melt flow rate from about 50 to 500 dg./min. at 190°C.

2. A phonograph record as defined in claim 1 wherein said molding composition further contains flow additive in an amount of up to about 10% by weight of resin in said composition.

3. A phonograph record as defined in claim 2, wherein said flow additive is selected from the group consisting of polyalphamethylstyrene, a polyacrylate, a polymethacrylate, and methacrylate-acrylate-styrene interpolymers.

4. A phonograph record as defined in claim 1 wherein said molding composition further comprises at least one heat stabilizer compound.

5. A phonograph record as defined in claim 4 wherein said heat stabilizer compound comprises a lead compound.

6. A phonograph record as defined in claim 4 wherein said heat stabilizer compound is a composition comprising barium and lead.

7. A phonograph record as defined in claim 4 wherein said heat stabilizer compound is a non-toxic metallo-organic compound.

8. A phonograph record as defined in claim 7 wherein said metallo-organic compound is at least one selected from the group consisting of calcium and zinc soaps.

9. A phonographic record as defined in claim 4 wherein said heat stabilizer compound is one comprising barium and cadmium.

10. A phonograph record formed from a composition comprising vinyl chloride-propylene copolymer, said copolymer containing about 4% by weight propylene as copolymerizate, and said copolymer having an intrinsic viscosity from about 0.53 to 0.58 dl./g. and a melt flow rate of from about 70 to 150 dg./min. at 190°C.

11. A phonograph record as defined in claim 10, wherein said composition further comprises polyalphamethylstyrene in an amount of up to about 10% by weight of the copolymer.

12. A phonograph record as defined in claim 10 wherein said composition further comprises a barium-lead heat stabilizer.

13. A phonograph record formed from a composition comprising vinyl chloride-propylene copolymer, said copolymer containing from about 7 to 8% by weight propylene as copolymerizate, and said copolymer having an intrinsic viscosity from about 0.53 to 0.6 dl./g. and a melt flow rate from about 100 to 300 dg./min. at 190°C.

14. A quadriphonic sound record formed from a composition comprising a copolymer of vinyl chloride with propylene, said copolymer containing from about 4 to 8% by weight copolymerized propylene and said copolymer having an intrinsic viscosity from about 0.45 to 0.7 dl./g. and a melt flow rate from about 50 to 500 dg./min. at 190°C.

15. A quadriphonic record as defined in claim 14, wherein said composition further comprises epoxidized soya oil and barium-lead heat stabilizer.

* * * * *